United States Patent [19]
Moritz

[11] Patent Number: 4,626,233
[45] Date of Patent: Dec. 2, 1986

[54] GUIDE CHAIN FOR FEED LINES

[75] Inventor: Werner Moritz, Siegen, Fed. Rep. of Germany

[73] Assignee: Kabelschlepp Gesellschaft mit beschränkter Haftung, Siegen, Fed. Rep. of Germany

[21] Appl. No.: 724,090

[22] Filed: Apr. 17, 1985

[30] Foreign Application Priority Data

Apr. 17, 1984 [DE] Fed. Rep. of Germany ....... 3414412

[51] Int. Cl.⁴ ............................................ F16G 13/02
[52] U.S. Cl. .................................... 474/206; 59/78.1
[58] Field of Search ............... 474/206, 213, 901, 202; 59/78.1

[56] References Cited

U.S. PATENT DOCUMENTS

| | | | |
|---|---|---|---|
| 3,098,349 | 7/1963 | Waninger | 474/206 X |
| 3,330,105 | 7/1967 | Weber | 59/78.1 |
| 3,382,668 | 5/1968 | Berkes et al. | 59/78.1 |
| 3,503,579 | 3/1970 | Kurlandsky | 474/206 X |
| 3,848,407 | 11/1974 | Moritz | 59/78.1 |
| 4,018,411 | 4/1977 | Hennig | 59/78.1 |
| 4,104,871 | 8/1978 | Moritz | 59/78.1 |
| 4,392,344 | 7/1983 | Gordon et al. | 59/78.1 |

Primary Examiner—Stephen J. Novosad
Assistant Examiner—Thuy M. Bui
Attorney, Agent, or Firm—Becker & Becker, Inc.

[57] ABSTRACT

A guide chain for guiding feed lines from a stationary connection to a movable consuming device. Separable cross pieces are provided which form through passages for the feed line. The cross pieces include cross bars and separating members which can be frictionally and positively interconnected. In order to improve the individual stability of the through passages to be adapted to the dimensions of the feed lines, the cross bars are provided on their inwardly directed wide sides with a mounting channel which has a C-shaped cross section for receiving a one-piece frame element or a segmented frame element, so that the through passages for the feed lines can be selectively formed by the separating members, or by the frame elements, or by a combination or separating members and frame elements.

13 Claims, 7 Drawing Figures

GUIDE CHAIN FOR FEED LINES

BACKGROUND OF THE INVENTION

1. Field of the Invention

The present invention relates to a guide chain for guiding transmission or feed lines, especially cables or hoses, from a stationary connection to a movable consuming device; to connect the links of respective link chains of the guide chain, separable cross pieces are provided which form through passages for the feed lines; each cross piece comprises at least two cross bars having a substantially flat cross-section with rounded-off narrow sides; disposed between the cross bars are spaced-apart separating members, the upper and lower ends of each of which are provided with undercut recesses; after the cross bars have been placed in these recesses, they can be turned about their longitudinal axes to frictionally and positively secure them to the separating members.

2. Description of the Prior Art

A guide chain of the aforementioned general type is disclosed in German Pat. No. 22 55 283 or U.S. Pat. No. 3,848,407. This known guide chain has the advantage that its cross pieces, completely pre-assembled and in various sizes, can be stored because the individual parts are frictionally and positively interconnected and form a stable grid construction. However, it has been shown in practice that tailored through passages are desired for a considerable number of orders for specific feed lines, which can then be individually guided and separated from other feed lines. It is not possible with the heretofore known guide chain to undertake the necessary adaptation of the through passages to the dimensions of the feed lines.

German Pat. No. 14 74 230 discloses a guide chain, the cross pieces of which comprise two cross bars, between which can be placed exchangeable center rest parts which are split vertically and/or horizontally; these parts individually form through passages which conform to the dimensions of the feed lines. With this heretofore known guide chain, the center rest parts are placed more or less loosely between the cross bars, which have a U-shaped or C-shaped profile, and, together with the cross bars, do not form a stable grid construction which can be mechanically pre-assembled and stored.

Starting with the aforementioned structure, an object of the present invention is to provide a guide chain of simple construction which has separable cross pieces which can be selectively mechanically pre-assembled from either spaced-apart separating members or frame elements provided with individual through passages or a combination of separating members and frame elements, and which form an inherently stable grid construction which can be stored for later assembly with the links of link chains.

BRIEF DESCRIPTION OF THE DRAWINGS

This object, and other objects and advantages of the present invention, will appear more clearly from the following specification in conjunction with preferred embodiments illustrated in the drawings, in which.

SUMMARY OF THE INVENTION

Figure 1:
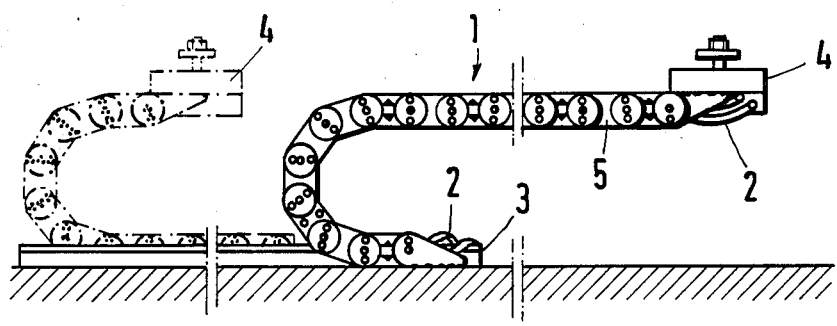
FIG. 1 is a side view which schematically illustrates a guide chain disposed between a stationary connection and a movable consuming device.

The guide chain of the present invention is characterized primarily in that the cross bars, on the inwardly directed wide sides, are provided with a mounting channel which has a c-shaped cross section for receiving a one-piece frame element or element with holes having an I-shaped cross section or a segmented frame element or element with holes having a T-shaped cross section, and in that the through passages for the feed lines are selectively formed by the separating members, or by the frame elements, or by a combination of separating members and frame elements.

Pursuant to one practical embodiment of the present invention, in order to improve the frictional and positive connection between the cross bars and the separating members, the cross bars can be provided on their narrow sides with a groove, and one arm or side of the recess of the separating members can be provided with a corresponding protrusion. To facilitate assembly, it has proven to be expedient to increase the resilience of that arm of the recess which is provided with the protrusion by means of a groove which is disposed further inwardly than is the protrusion.

Pursuant to a further embodiment of the present invention, the separating members, in the vicinity of the base of their recesses, can be provided with cut away portions for receiving support sections which can be inserted into the mounting channels of the cross bars, and can have a T-shaped or I-shaped cross section. In order to improve the connection between the cross bars and the frame elements or support sections, is proposed that the cross bars, in the central axis of their mounting channels, be provided with a rib which engages in corresponding grooves on the frame elements and/or support sections.

The end faces of the cross bars, between the narrow sides and the mounting channels, can be provided with threaded holes for connecting them with the links of a link chain.

A guide chain constructed in conformity to the teaching of the present invention has the advantage of being able to individually adapt the through passages to the dimensions of individual feed lines, when this is desired or necessary during application, without thereby losing the advantage of a grid construction which is inherently stable and can be mechanically pre-assembled. The adaptation of the through passages to the dimensions of the feed lines can be effected by the choice and size of the frame elements and/or at the same time by a combination of frame elements and separating members. In this manner, while maintaining the advantages of the heretofore known guide chains, on the one hand the ability to individually adapt the construction, and on the other hand at the same time also the economy of storage, are optimized.

DESCRIPTION OF PREFERRED EMBODIMENTS

Referring now to the drawings in detail, a guide chain 1 has the task of guiding transmission or feed lines 2, generally cables or hoses, from a stationary connection 3 to a movable consuming device 4, etc., in a manner free of tension and kinks. The guide chain 1 is formed from two spaced-apart link chains 5, each of which is composed of links 6, the pivot angle of which relative to one another, is limited in a given direction by stops 7. The links 6 of the two chains 5 are interconnected by cross pieces 8 which are disposed at a distance from one another. The cross pieces 8 form through passages 9 which are aligned with one another, and in which are placed the feed lines 2.

Figure 5:
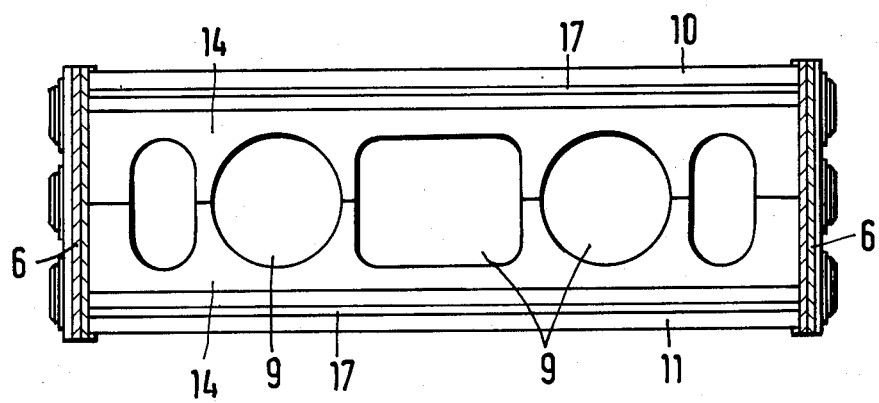
FIG. 5 is a partially sectioned view of a cross piece having segmented frame elements.
Figure 6:
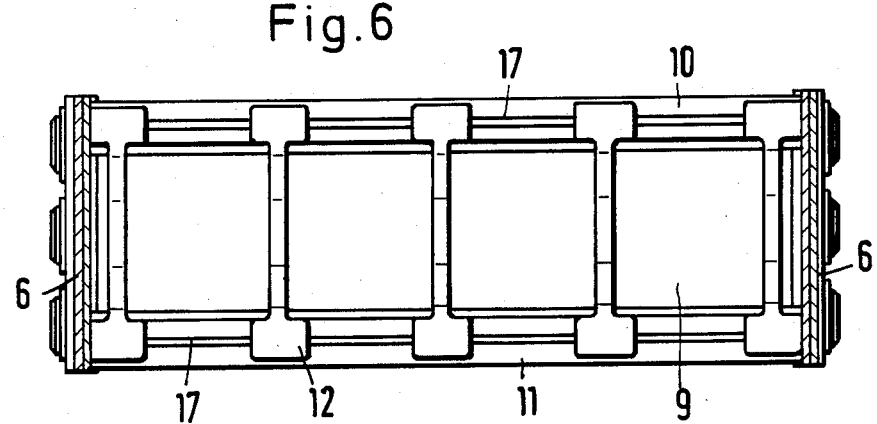
FIG. 6 is a partially sectioned view of a cross piece having separating members.
Figure 7:
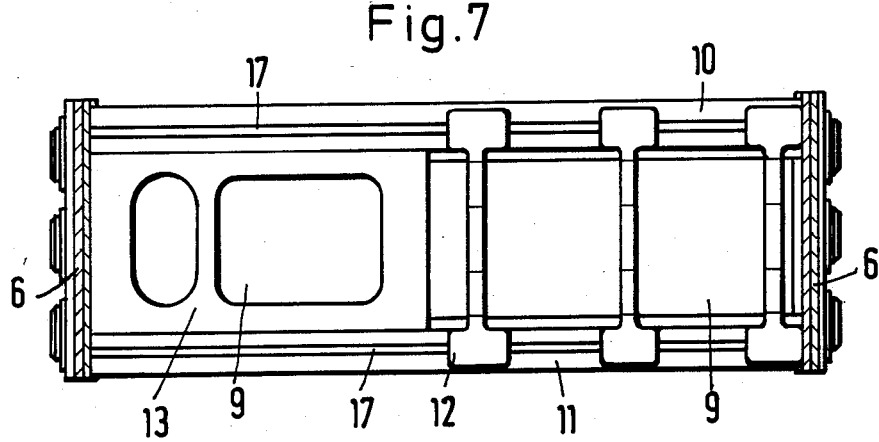
FIG. 7 is a partially sectioned view of a cross piece having a combination of separating members and a one-piece frame element.

Each cross piece 8 comprises an upper cross bar 10 and a lower cross bar 11, between which are disposed a plurality of separating members 12, onepiece frame elements 13, segmented frame elements 14, or a combination of separating members and frame elements, as shown in FIGS. 5 to 7. The cross bars 10, 11 have a bar-like profile, with rounded-off narrow sides 15 and flat wide sides 16. A groove 17 is provided on each of the narrow sides 15. Provided on the inwardly directed wide side 16 of the cross bars 10, 11 is a mounting channel 18, which has a C-shaped cross-section, and is provided in its center with a rib 19.

Undercut recesses 20 are disposed in the upper and lower ends of the separating members 12; at each end, one of the recesses has a protrusion 21, which is designed to engage one groove 17 of the cross bars 10, 11. Below that side of the recess 20 which is provided with protrusion 21, a groove 22 is provided in the separating member 12 in order to improve the flexibility of this side.

Support sections 23 are disposed in the mounting channels 18 of the cross bars 10, 11 in the vicinity of the separating members 12; these sections 23 can be made of plastic, and form protective support surfaces for the feed lines 2. Cut-away portions 24 are provided in the separating members 12 in the vicinity of the external portion of the support sections 23.

Figure 4:
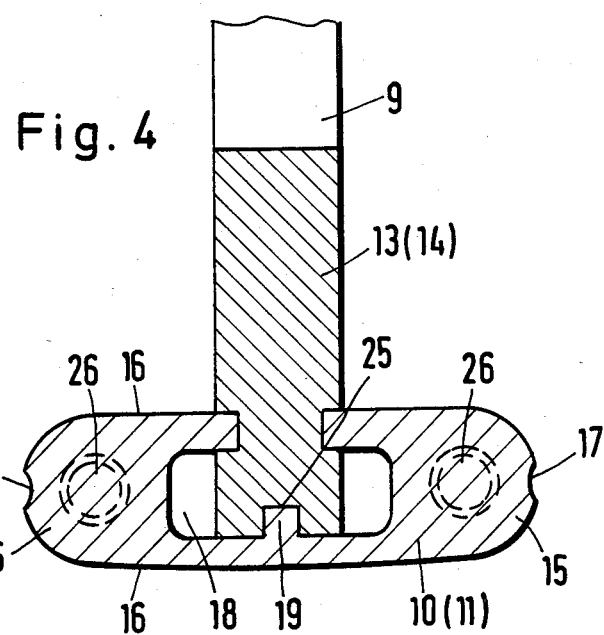
FIG. 4 is a cross section of a cross bar in which is placed a frame element.

In the embodiment illustrated in FIG. 4, a one-piece frame element 13, or even a segmented frame element 14, is mounted in the channel 18 of the cross bars 10, 11. The frame elements 13, 14, and also the support section 23, are provided with grooves 25 with which they ride upon the ribs 19 in order to improve the stability of the connection. The pre-assembly of the cross bars 10, 11 with the separating members 12 is effected by placing that recess 20 of the separating member 12 which does not have a protrusion 21 onto one narrow side 15 of the cross bars 10, 11 at an angle to the latter, and then snapping the other recess 20 onto the opposite narrow side 15 of the cross bars 10, 11. When the separating member 12 is mounted on one of the two cross bars 10, 11, the opposite cross bar is placed into the aligned recesses, and is then rotated about its longitudinal axis until it is completely snapped in.

During the pre-assembly, the frame elements 13, 14 and the support sections 23 are merely pushed into the mounting channels 18 of the cross bars 10, 11 from the end with slight prestress.

Figure 2:
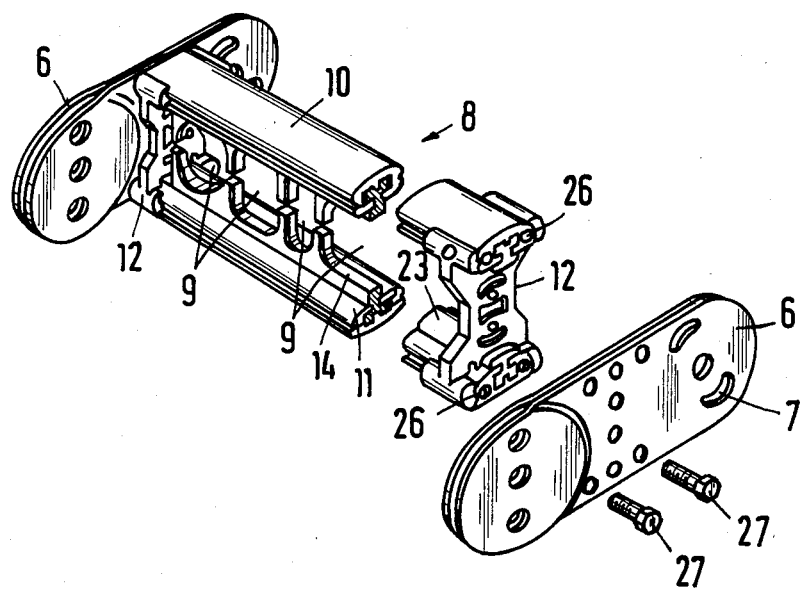
FIG. 2 is a partially exploded isometric view of a chain member.
Figure 3:
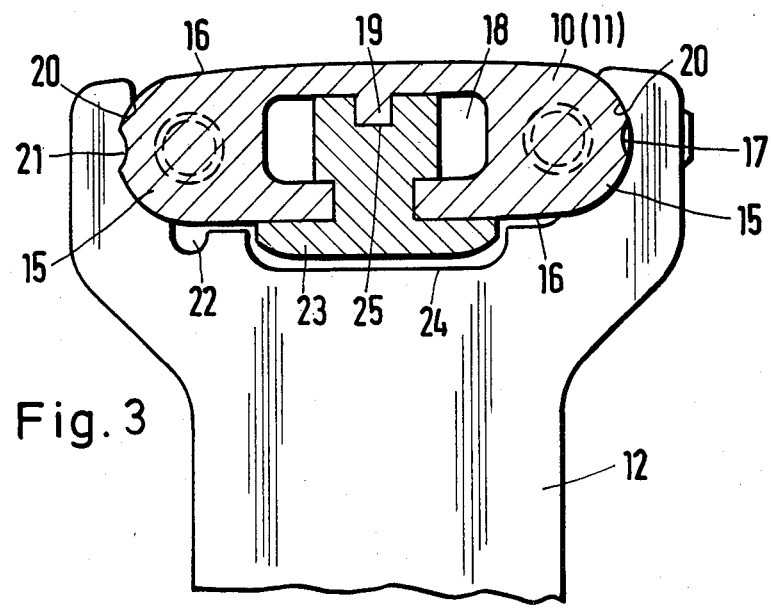
FIG. 3 is a cross section of a cross bar secured in a separating member.

To connect the cross bars 10, 11 with the links 6 of the link chains 5, threaded holes 26 are provided in the end faces of the cross bars 10, 11. Screws 27, which extend through the links 6, are screwed into the threaded holes 26; for ease of illustration, only two of such screws 27 are illustrated in FIG. 2.

The present invention is, of course, in no way restricted to the specific disclosure of the specification and drawings, but also encompasses any modifications within the scope of the appended claims.

What I claim is:

1. A guide chain for guiding feed lines sectionally having individually different measurements extending from a stationary connection to a movable consuming device; to connect the links of respective link chains of said guide chain, separable crosspieces being provided which form through passages for said feed lines; each of said crosspieces comprising at least two crossbars having a substantially flat cross-section with wide sides and rounded-off narrow sides; the improvement wherein:

each of said crosspieces further comprises at least one, of at least one type of, element disposed between said crossbars to interconnect the latter; said connecting elements being usable in any desired combination of the types thereof collectively to form said through passages via said connecting elements per se having measurements adaptable individually to different measurements of guiding feed lines; and that wide side of each of said crossbars which is directed inwardly, in a location toward another one of said crossbars, being provided with a mounting channel having a C-shaped cross-section; said connecting elements being respectively connected with said crossbars by being placed on said narrow sides thereof, respectively by being placed in said mounting channels thereof.

2. A guide chain according to claim 1, in which said elements include frame elements, which are provided with holes to form said through passages, and which are received by said mounting channels of said crossbars.

3. A guide chain according to claim 2, in which said frame elements are one-piece elements having an I-shaped cross-section.

4. A guide chain according to claim 2, in which said frame elements are segmented elements having a T-shaped cross-section.

5. A guide chain according to claim 1, in which said elements include spaced-apart separating members which respectively have two ends, each of which is provided with an undercut recess, so that each end of a given separating member has two undercut arms between which is disposed one of said recesses; a crossbar is adapted to be placed in one of said recesses and, by a relative rotation between said crossbar and said separating member, is connected to said arms of the latter in a frictional and positive manner.

6. A guide chain according to claim 5, in which said elements include a combination of:

said separating members; and frame elements, which are provided with holes to form said through passages, and which are received by said mounting channels of said crossbars.

7. A guide chain according to claim 6, in which each of said narrow sides of said crossbars is provided with a groove; and in which, at each end of said separating member, one of said arms is provided with a protrusion which conforms to said groove.

8. A guide chain according to claim 7, in which that arm of a given end of said separating member which is provided with said protrusion is further provided with a groove to increase the resilience of that arm.

9. A guide chain according to claim 6, which includes a support section, which is adapted to be placed into said mounting channels of said crossbars; and in which each end of said separating member, in the vicinity of the base of its recess, is provided with a cutaway portion to accommodate part of said support section.

10. A guide chain according to claim 9, in whcih said support section has a T-shaped cross-section.

11. A guide chain according to claim 9, in which said support section has an I-shaped cross-section.

12. A guide chain according to claim 9, in which said crossbars, in the center portion of each of its mounting channels, is provided with a rib which is adapted to engage a corresponding groove in said frame elements and said support sections.

13. A guide chain according to claim 1, in which the end faces of said crossbars, between said narrow sides and said mounting channels thereof, are provided with threaded holes to effect said connection to said links of said link chains.

* * * * *